United States Patent
Sunkavally et al.

(10) Patent No.: US 11,258,603 B2
(45) Date of Patent: Feb. 22, 2022

(54) ACCESS CONTROLS FOR QUESTION DELEGATION ENVIRONMENTS

(71) Applicant: EMC IP Holding Company LLC, Hopkinton, MA (US)

(72) Inventors: Naveen Sunkavally, Cary, NC (US); Brian C. Mullins, Burlington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 228 days.

(21) Appl. No.: 16/527,669

(22) Filed: Jul. 31, 2019

(65) Prior Publication Data

US 2021/0036850 A1    Feb. 4, 2021

(51) Int. Cl.
*H04L 9/08* (2006.01)
*G06Q 10/06* (2012.01)
*H04L 9/32* (2006.01)
*H04L 29/06* (2006.01)

(52) U.S. Cl.
CPC ....... *H04L 9/0891* (2013.01); *G06Q 10/0635* (2013.01); *H04L 9/088* (2013.01); *H04L 9/3215* (2013.01)

(58) Field of Classification Search
CPC ..... H04L 9/0891; H04L 9/088; H04L 9/3215; H04L 9/0825; H04L 63/0428; H04L 63/108; H04L 63/06; G06Q 10/0635
See application file for complete search history.

(56) References Cited

U.S. PATENT DOCUMENTS 7,127,524 B1 * 10/2006 Renda ................ H04L 29/12 709/245
8,793,757 B2 * 7/2014 Ahn .................. H04L 63/0853 726/1

(Continued)

OTHER PUBLICATIONS

Office of the Comptroller of the Currency, Risk Management for Third Party Relationships—OCC Expectations for Wealth Management Activities FIRMA Annual Risk Management Conference, Apr. 22, 2015, https://www.thefirma.org/files/conference/2015/Dalton-Risk%20Mgt%20Third%20Parties.pdf.

(Continued)

*Primary Examiner* — Vu V Tran
(74) *Attorney, Agent, or Firm* — Ryan, Mason & Lewis, LLP

(57) ABSTRACT

Techniques are provided for access controls for question delegation environments. One method comprises obtaining a security policy for a question obtained from a user; monitoring responses to the question; and enforcing, by a third-party portal processing system, access controls within the security policy for data associated with the question and/or the responses to the question, wherein the access controls comprise one or more restrictions with respect to a time duration to access the data and/or a number of people that may access the data. The third-party portal processing system evaluates whether the time duration to access the data has expired before providing access to the data and/or whether the number of people that may access the data has been exceeded before providing access to the data. A client-side encryption of the data is optionally performed by a provider of the data.

20 Claims, 11 Drawing Sheets

(56) References Cited

U.S. PATENT DOCUMENTS

| | | | |
|---|---|---|---|
| 2003/0088520 A1* | 5/2003 | Bohrer | G06Q 10/10 |
| | | | 705/74 |
| 2004/0030566 A1 | 2/2004 | Brooks Rix | |
| 2008/0046976 A1* | 2/2008 | Zuckerberg | H04L 63/102 |
| | | | 726/4 |
| 2008/0271110 A1 | 10/2008 | Graves | |
| 2009/0276257 A1* | 11/2009 | Draper | B25J 9/06 |
| | | | 705/7.28 |
| 2011/0137987 A1 | 6/2011 | Tyree | |
| 2011/0302398 A1* | 12/2011 | Ureche | H04L 9/0894 |
| | | | 713/2 |
| 2014/0331317 A1* | 11/2014 | Singh | G06F 21/6218 |
| | | | 726/22 |
| 2015/0248418 A1* | 9/2015 | Bhardwaj | G06F 16/122 |
| | | | 707/694 |
| 2018/0285882 A1* | 10/2018 | Jayaram | G06Q 20/227 |
| 2021/0036850 A1 | 2/2021 | Sunkavally | |
| 2021/0241192 A1 | 8/2021 | Mullins | |

OTHER PUBLICATIONS

Mike Odgen, Third-Party Assessment Exchanges and Undue Risk, Lockpath, Sep. 25, 2018, https://www.lockpath.com/blog/vendor-risk-management/third-party-assessment-exchanges-undue-risk/.
U.S. Appl. No. 16/456,302, filed Jun. 28, 2019, entitled: Security Policy Exchange and Enforcement for Question Delegation Environments.

* cited by examiner

ACCESS CONTROLS FOR QUESTION DELEGATION ENVIRONMENTS

FIELD

The field relates generally to information processing.

BACKGROUND

Questionnaires are often used by companies to assess the risk posed by third-party vendors and partners. In some cases, responses from third parties may contain highly sensitive information, particularly as the responses pertain to questions about sensitive topics, such as information security practices and/or financial information. In such cases, companies and third parties often enter into non-disclosure agreements (NDAs) to ensure that the third-party data is handled in prescribed ways by the company receiving the data. There is not a clear way, however, to translate the requirements of an NDA, including access control requirements, into requirements that are technically enforceable, verifiable, and auditable. NDAs may also be vague and leave certain requirements open to interpretation.

A need exists for a mechanism for specifying access control requirements for questionnaires and/or associated responses in such a way that an intermediate platform can interpret and enforce those requirements.

SUMMARY

In one embodiment, a method comprises obtaining a security policy for at least one question obtained from a user; monitoring one or more responses to the at least one question; and enforcing, by a third-party portal processing system, one or more access controls within the security policy for data associated with one or more of the at least one question and the one or more responses to the at least one question, wherein the one or more access controls comprise one or more restrictions with respect to one or more of a time duration to access the data and a number of people that may access the data.

In some embodiment, the exemplary method further comprises evaluating whether the time duration to access the data has expired before providing access to the data and/or whether the number of people that may access the data has been exceeded before providing access to the data.

In at least one embodiment, a client-side encryption of the data is performed by a provider of the data using a symmetric key pair to generate an encrypted version of the data. The third-party portal processing system stores the encrypted version of the data comprising an encrypted payload and an encrypted symmetric key.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for access controls for question delegation environments.

In one or more embodiments, techniques are provided for companies and third parties to describe their security requirements, including access control requirements, for questionnaires in such a way that an intermediate platform shared by the companies and third parties can interpret and enforce those requirements. The disclosed intermediate platform allows companies to publish questionnaires to be responded to by the third parties and allows third parties to answer questionnaires and submit responses back to companies. Among other benefits, the disclosed access control framework makes access control requirements between companies and third parties explicit, and the access control requirements can be technically enforced, simultaneously protecting third parties and companies from the mishandling of third-party data.

In some embodiments, when a company publishes a questionnaire to a third party, the company also sends a machine-readable security policy document describing expectations for how data related to the questionnaire and/or responses is handled. The disclosed access control framework provides a mechanism for parties to enforce the access control aspects of a security policy.

Figure 1:
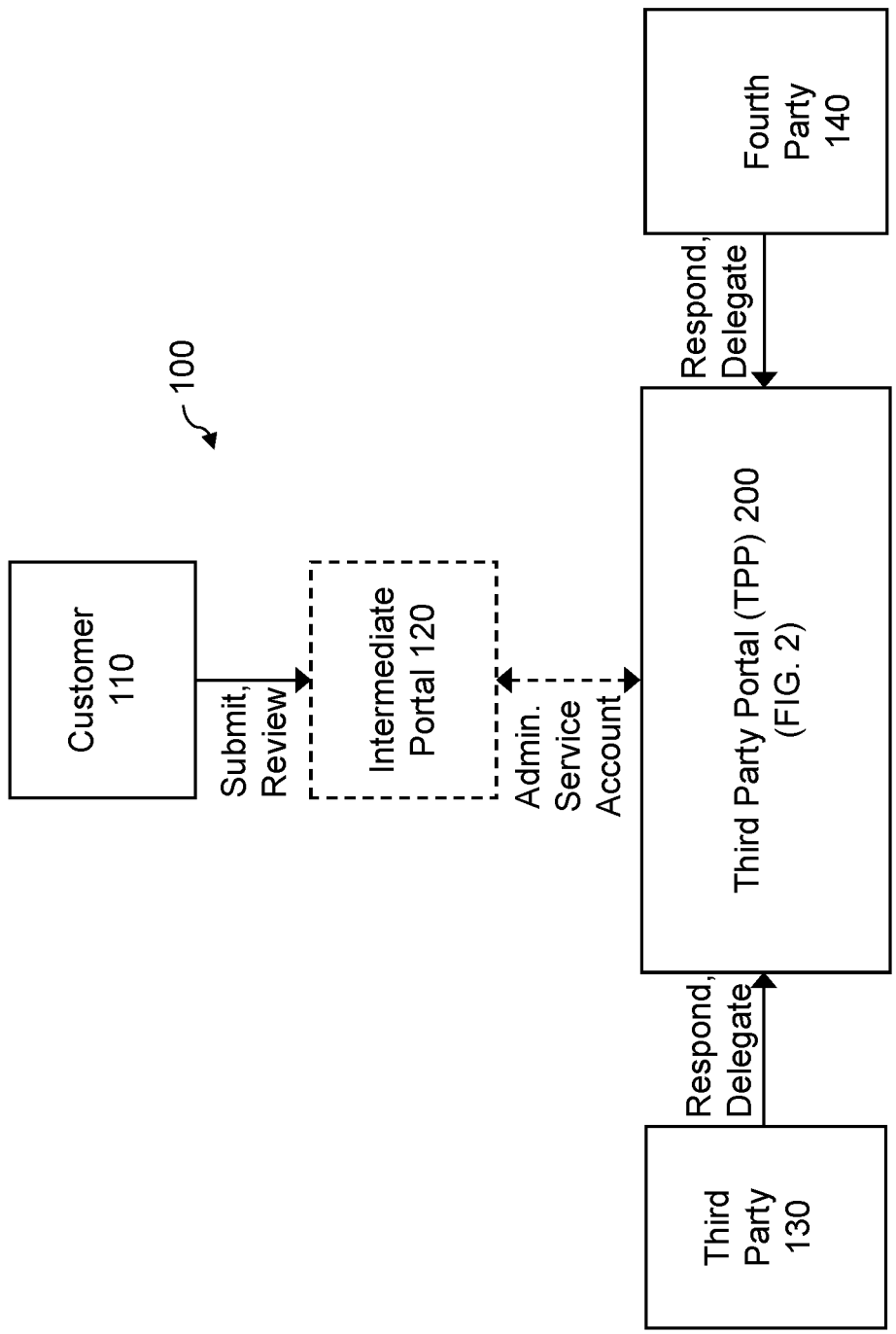
FIG. 1 illustrates a questionnaire submission and response platform, according to at least one embodiment of the disclosure.

FIG. 1 illustrates a questionnaire submission and response platform 100, according to at least one embodiment of the disclosure. As shown in FIG. 1, a customer 110 submits one or more questionnaires, optionally by means of an intermediate portal 120, discussed further below, to a third-party portal 200, as discussed further below in conjunction with FIG. 2. Questions in the questionnaire are to be responded to (and/or otherwise processed) by a designated third party 130. The third party 130 responds to the questionnaire and may optionally delegate one or more responses to another party, referred to as a fourth party 140. The fourth party 140 is delegated the responsibility for responding to one or more questions by the third party 130. The fourth party 140 can optionally delegate to fifth parties (not shown) and so on. While only one instance is shown in FIG. 1 for each of the customer 110, the third party 130 and the fourth party 140, multiple or zero instances of the customer 110, the third party 130 and/or the fourth party 140 can be present in various embodiments, as would be apparent to a person of ordinary skill in the art. It is noted that the customer 110 may have multiple people with distinct roles working on a given questionnaire, such as a submitter and a reviewer, as discussed further below in conjunction with the example of FIG. 3, for example.

In the exemplary embodiment of FIG. 1, the customer 110, third party 130 and the fourth party 140 share the same third-party portal 200.

As noted above, customers 110 optionally submit the questionnaires to the third-party portal 200 by means of the intermediate portal 120, such as the RSA Archer® platform, commercially available from RSA Security LLC, of Dell EMC, Hopkinton, Mass. The intermediate portal 120 and the third-party portal 200 communicate, for example, over a secure link using an optional administrative service account. It is noted that the third party 130 and fourth party 140 continue to use the third-party portal 200 to respond to questionnaires and/or to delegate questionnaires.

In one or more embodiments, a question submitted by the customer 110 typically comprises the following exemplary attributes:
UUID: a unique identifier for the question;
Text: the actual question; and
Tags: a set of key-value pairs describing the question, such as category.

A questionnaire comprises a list of one or more questions.

As noted above, the customer 110 is an entity (e.g., an organization or individual) that submits a questionnaire to be filled out by a designated third party 130. The customer 110 may be characterized in some embodiments, as follows:
Id (Identifier); and
Tags: an arbitrary set of key-value pairs describing the customer 110, such as a customer name and/or primary office location.

As noted above, the third party 130 is an entity that responds to a questionnaire and may optionally delegate certain responses to a fourth party 140. The third party 130 may be characterized in one or more embodiments, as follows:
Id; and
Tags: an arbitrary set of key-value pairs describing the third party 130.

As noted above, the fourth party 140 is an entity that is delegated responsibility for responding to one or more questions by a third party 130. The fourth party 140 can optionally delegate one or more questions to one or more fifth parties and so on. The fourth party 140 may be characterized in some embodiments, as follows:
Id; and
Tags: an arbitrary set of key-value pairs describing the fourth party 140.

A user of the questionnaire submission and response platform 100 is an entity and/or person representing an organization using the third-party portal 200. It is noted that a user can take the role(s) of, for example, a customer 110, a third party 130 and/or a fourth party 140. Further, the term "user" herein is intended to be broadly construed so as to encompass numerous arrangements of human, hardware, software or firmware entities, as well as combinations of such entities.

Figure 2:
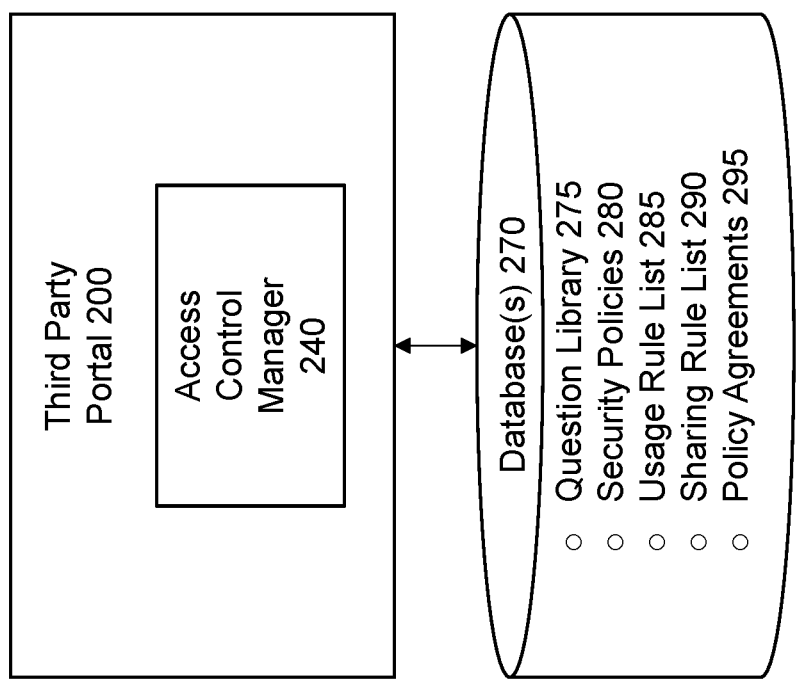
FIG. 2 illustrates an exemplary implementation of the third-party portal of FIG. 1 in further detail, according to some embodiments.

FIG. 2 illustrates an exemplary implementation of the third-party portal 200 of FIG. 1 in further detail, according to some embodiments. As shown in FIG. 2, the exemplary third-party portal 200 comprises an access control manager 240 that implements the disclosed access control techniques, as discussed further below in conjunction with, for example, FIGS. 3 through 10. The exemplary third-party portal 200 maintains one or more database(s) 270 comprising, for example, a question library 275, security policies 280, a usage rule list 285, a sharing rule list 290, and policy agreements 295.

In some embodiments, the question library 275 comprises a list of substantially all possible questions across all questionnaires submitted to the third-party portal 200, and maintained by the third-party portal 200.

The security policies 280 comprise, for example, a map that describes directives to be enforced for questions. The security policy map can be expressed, for example, in a key-value format, such as question⇒list of directives, where the key is the question and the value is the list of directives to be enforced for that question.

Requirements covered by the security policies 280 can include (but are not limited to):
Data access expiration: how long a company has access to a response of a third party;
Data access maximum viewers: maximum number of unique individuals at a company that can view a response of a third party;
Data retention: how long the platform retains the questionnaire response;
Data location: geographic location where the questionnaire response is stored geographically; and
Data encryption: whether the third-party response needs to be protected using client-side encryption (e.g., private keys only held by customers or third parties and not the third-party portal 200) or if it is sufficient to encrypt data using platform-managed keys.

A security policy 280 can be altered after the security policy 280 has been accepted by both the customer 110 and a third party 130. In this case, the customer 110 or third party 130 can use the third-party portal 200 to propose an update to the security policy 280, and then follow a similar workflow as described herein to accept, reject, or update the policy. In some cases, it may not be possible for the third-party portal 200 to retroactively apply a new policy after the assessment has already been started. In those cases, the third-party portal 200 would raise an alert and ask if the current in-progress questionnaire should be abandoned and restarted with a new policy.

Directives comprise instructions describing a security or compliance control to be enforced by the third-party portal 200. Exemplary directives include:

dataAccessExpiration=12 and dataAccessExpirationUnits=months: access to question response granted for 12 months to recipient of question response;

dataAccessMaxViewers=5: at most five people at the recipient organization are allowed to view a question's response; and dataLocation=EU: question response data must be stored in a data center in the European Union.

The usage rule list 285 comprises one or more usage rules, represented, for example, as an ordered list (in a similar manner as network firewall rules). The last rule is a default rule in some embodiments that matches all questions and sources and purposes (question.id=*, source.id=*, purpose=*). The default rule could be completely open with no directives, meaning the security policy is applied.

A usage rule, in some embodiments, is a rule describing a set of directives to be applied to questions that match conditions in the rule. In some embodiments, three conditions in a usage rule are a question matcher pattern, a source matcher pattern, and a purpose. Usage rules are used for questionnaire responses coming back to a user (e.g., the user is playing the role of a customer 110 or a third party 130 delegating to a fourth party 140). If the user is playing the role of a customer 110, the purpose should be VIEW. If the user is playing the role of third party 130 delegating to a fourth party 140, the purpose should be SHARE. An exemplary usage rule comprises:

Question matcher pattern: A pattern that can be matched against a question and produces a Boolean result (true or false). The pattern uses a syntax like regular expressions and can apply to any part of a Question: the UUID, Text, and Tags;

Source matcher pattern: A pattern that can be matched against a third party and produces a Boolean result (true or false). The pattern uses a syntax like regular expressions and can apply to the third-party ID and Tags;

Purpose: Must be either VIEW or SHARE or both; and

List of Directives.

The sharing rule list 290 comprises one or more sharing rules, represented as an ordered list (in a similar manner as network firewall rules). The last rule is a default rule in some embodiments that matches all questions, destinations, and purposes (question.id=*, destination.id=*, purpose=*). The default rule could be completely open with no directives, meaning the security policy is applied.

A sharing rule, in some embodiments, is a rule describing a set of directives to be applied to questions that match conditions in the rule. The three conditions are the question matcher pattern, a destination matcher pattern, and a purpose. Sharing rules are used for questionnaire responses that a user is sending out, i.e., the user is playing the role of a third party 130 responding to a questionnaire, or a fourth party 140 sharing data with a third party 130 who is responding back to a customer 110. If the user is directly responding to a customer 110, the purpose should be VIEW. If the user is responding to a third party 130 who is then sharing his/her data with a customer 110, the purpose should be SHARE. An exemplary sharing rule comprises:

Question matcher pattern: A pattern that can be matched against a question and produces a Boolean result (true or false). The pattern uses a syntax like regular expressions and can apply to any part of a Question: the UUID, Text, and Tags;

Destination matcher pattern: A pattern that can be matched against an organization and produces a Boolean result (true or false). The pattern uses a syntax like regular expressions and can apply to the organization's ID and Tags, and also the degree of delegation, where the degree represents how many hops the data can be shared in case of delegation. For instance, a degree of 2 means a fourth party allows a third party to share its data with a customer that has reached out to the third party;

Purpose: Must be either VIEW or SHARE or both; and

List of Directives.

The policy agreements 295 comprise agreements between a third party 130 and a customer 110 that comprise:

Third-party id;

Customer id;

Security Policy;

Purpose: one of VIEW or SHARE;

Agreement expiration date;

Third-party digital signature;

Customer digital signature;

Linked agreement(s): one or more linked policy agreements. This applies in the case of delegation when a third party 130 has delegated responses to a fourth party 140, in which case the third party 130 and the fourth party 140 enter into an agreement which is linked to the original agreement between the third party 130 and the customer 110; and Amendment(s): zero or more signed modifications to the original agreement.

In some embodiments, the digital signature from the fourth party 140 in a policy agreement 295 is wrapped with a digital signature from the third party 130.

In one or more embodiments, a usage policy matcher is a component of the third-party portal 200 that takes as inputs a questionnaire and a usage rule list and returns a security policy. For each question in the questionnaire, the usage policy matcher goes, typically in order, through the usage rule list and evaluates the question matcher pattern against the question and the source matcher pattern against the third party 130 that the questionnaire is intended for. For each question, the list of directives for the first matching usage rule is returned. If none of the usage rules match, the default (last) usage rule in the list is applied.

In one or more embodiments, an exemplary sharing policy matcher processes a questionnaire and a sharing rule list 290 and returns a security policy 280. For each question in the questionnaire, the sharing policy matcher goes, typically in order, through the sharing rule list 290 and evaluates the question matcher pattern against the question and the destination matcher pattern against the organization the questionnaire response is intended for. For each question, the list of directives for the first matching sharing rule is returned. If none of the sharing rules match, the default (last) sharing rule in the list is applied.

In an embodiment, an exemplary enforcement engine evaluates and enforces directives. A trigger is an event in the third-party portal 200 that triggers the enforcement engine to check one or more directives. Each directive is associated with one or more triggers. Triggers can be based on events related to a questionnaire, such as "Questionnaire submitted", or timer-based, such as "New day started."

A question matcher optionally processes questions from the questionnaire and matches them against existing questions known to the third-party portal 200 in the question library 275.

In one or more embodiments, an agreement checker processes the list of questions and checks for the most recent existing unexpired data usage agreement with Purpose=VIEW in the account of the customer 110 that cover all the questions in the questionnaire. As part of this, the agreement checker optionally also needs to validate any linked agreements in cases where third parties are sharing data on behalf of fourth parties.

A conflict checker attempts to construct an expected security policy for the third party 130.

For a more detailed discussion of various aspects of the third-party portal 200, see, for example, U.S. patent application Ser. No. 16/456,302, filed Jun. 28, 2019, entitled "Security Policy Exchange and Enforcement for Question Delegation Environments," incorporated by reference herein in its entirety.

In some embodiments, exemplary access control requirements include one or more of:
1) limiting access to sensitive data for a certain period of time;
2) auditing accesses of sensitive data;
3) limiting the number of people with access to the sensitive data; and
4) client-side encryption of sensitive data.

Figure 3:
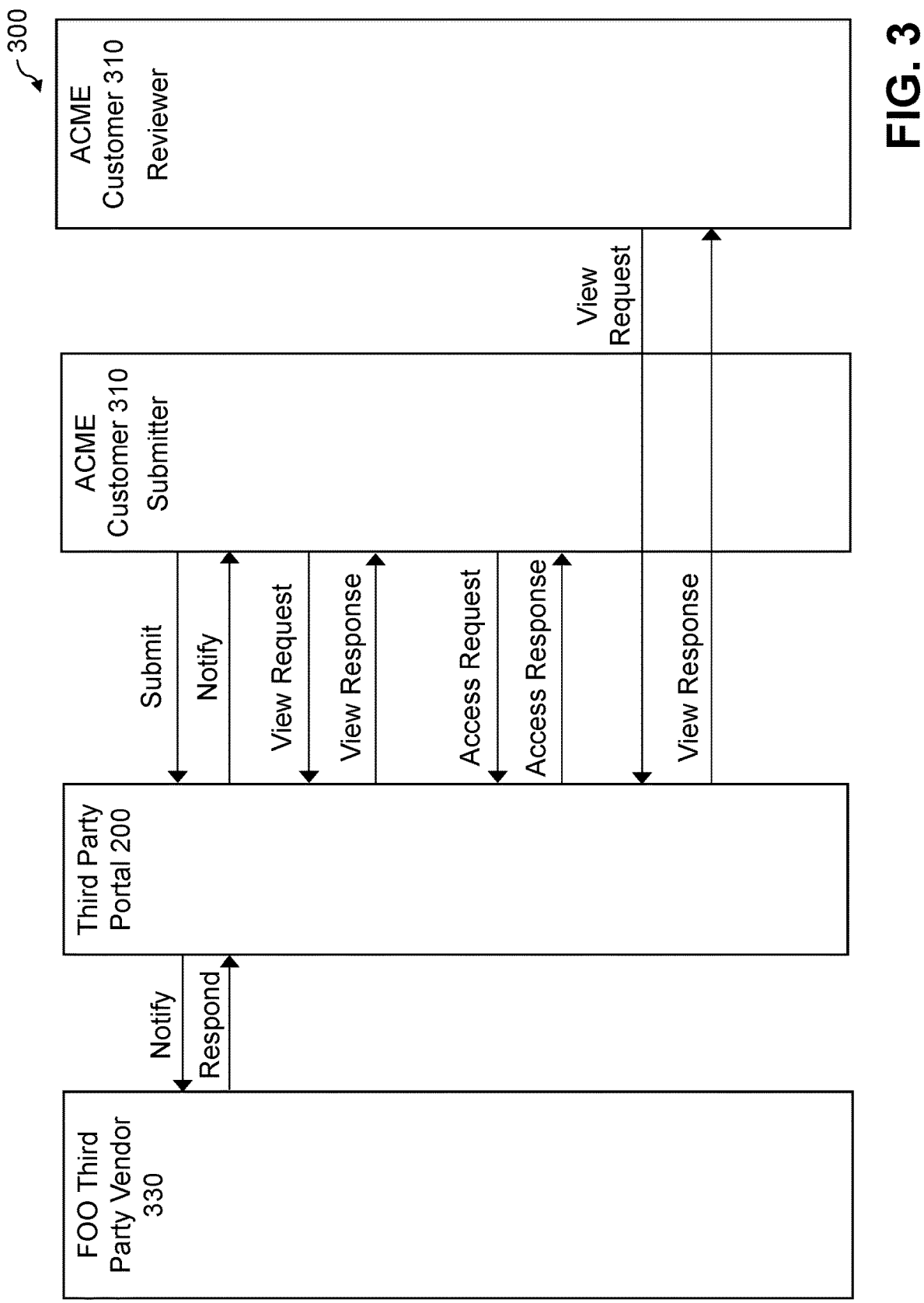
FIG. 3 is a communication diagram illustrating an exemplary implementation of a question delegation process according to an embodiment of the disclosure.

FIG. 3 is a communication diagram 300 illustrating an exemplary implementation of a question delegation process according to an embodiment of the disclosure, where customers 110 submit questionnaires directly to the third-party portal 200, without an intermediate portal 120. As shown in the example of FIG. 3, a submitter at the customer 310, such as customer ACME, submits a questionnaire to a person at third-party vendor 330, such as vendor FOO. The recipient person at the third-party vendor 330 is notified of the questionnaire and responds to the questionnaire. In the embodiment of FIG. 3, the third-party vendor 330 does not employ client-side encryption functionality.

Certain questions in the questionnaire may have responses that the third-party vendor 330 considers sensitive. These sensitive responses can be associated, for example, with two parameters: 1) an expiration date beyond which customer 310 should no longer have access to those sensitive responses, and 2) a maximum number of people at customer 310 that are allowed access to the sensitive data. These parameters can be set by the third-party vendor 330 based on prior negotiations with the customer 310 (for instance, using the techniques disclosed in U.S. patent application Ser. No. 16/456,302, referenced above) or at the time that the third-party vendor 330 sends the questionnaire back to the customer 310.

The third-party portal 200 keeps track of the expiration date for each question and the limit for the number of people allowed to access the sensitive data. The third-party portal 200 also maintains a list of people at the customer 310 who are allowed to view the questionnaire. In some embodiments, the submitter is automatically added to this list.

The submitter at the customer 310 receives the questionnaire and requests to view the questionnaire. Non-sensitive responses in the questionnaire can be shown immediately to the submitter, when the submitter requests to view and/or access a non-sensitive response. For sensitive responses, the third-party portal 200 first verifies that the expiration date has not passed. Any sensitive responses for which the expiration date has passed are not rendered to the submitter.

The third-party portal 200 optionally audits the viewing of sensitive data by the submitter. Suppose later that the submitter wants to allow access to another person on his team, such as a reviewer that reviews responses. The submitter sends an "Access Request" on behalf of the "reviewer."

The third-party portal 200 checks that the limit for the maximum number of people allowed access to the sensitive data is not already met. If the limit is not yet met, the third-party portal 200 adds the reviewer to a list of people at the customer 310 who are allowed to view the questionnaire. Otherwise, the access request is rejected.

If the access request is approved, the reviewer can later try to view the responses to the questionnaire. The third-party portal 200 again checks the expiration dates for any sensitive responses, and also audits who viewed the sensitive data.

Revoking Access

There are two cases for revoking access. In one case, the submitter person at the customer 310 may want to remove access for a specific reviewer, for example. In another case, the third-party vendor 330 may want to revoke access to the customer 310. Note that the latter case may not be allowed by the platform if an agreement was reached beforehand between the third-party vendor 330 and the customer 310 for the duration of time that the customer 310 was allowed access.

For the first case, the submitter simply asks the third-party portal 200 to remove access to the questionnaire to the reviewer, and the third-party portal 200 removes the reviewer from the list of people allowed access to the sensitive data. The third-party portal 200 would update the count of current viewers accordingly by decrementing the count by one.

For the second case, the third-party vendor 330 asks the third-party portal 200 to remove access to the customer 310, and the third-party portal 200 clears the list of everyone at customer 310 allowed access and moves the expiration data to the current time or before.

It is noted that revocation optionally only applies to sensitive responses. Non-sensitive responses can continue to be viewed. All revocations are audited by the third-party portal 200 in some embodiments.

Delegation to a Fourth or Fifth Party

As shown in FIG. 3, in some cases, a third-party vendor 330 may delegate responses to certain questions to fourth-party vendors (not shown in FIG. 3), who may in turn delegate responses to fifth parties (not shown), and so on. Following a similar process as described above, a fourth or fifth party can designate certain responses as sensitive and attach expirations and counts for the maximum number of people allowed to view the response. In this case, expirations and counts can optionally be set for each degree of indirection. For instance, a fourth-party vendor 340 could stipulate an expiration and count for the third-party vendor 330 that the fourth-party vendor 340 is providing the response to, and a separate expiration and count for customers viewing the response.

Client-Side Encryption

Figure 4:
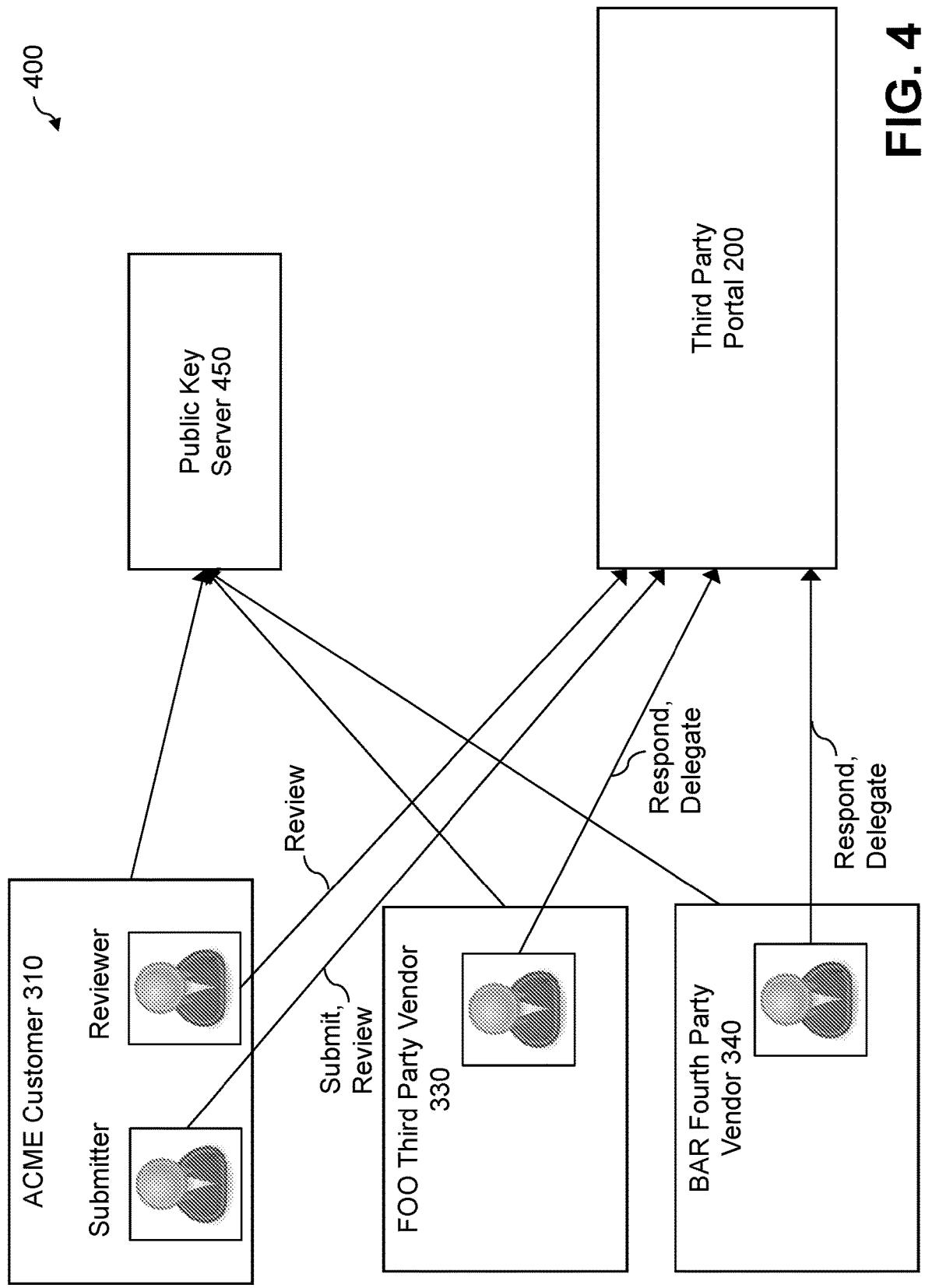
FIG. 4 illustrates an exemplary implementation of a question delegation environment with access control and client-side encryption functionality according to an embodiment.

FIG. 4 illustrates an exemplary implementation of a question delegation environment 400 with access control and client-side encryption functionality according to one embodiment, where customers 110 again submit questionnaires directly to the third-party portal 200, without an intermediate portal 120.

One or more aspects of the disclosure recognize that client-side encryption is useful when third-party vendors 330 and fourth-party vendors 340 (or fifth parties) do not trust the third-party portal 200 with the sensitive data they are sharing with customers. To implement client-side encryption, a public key server 450 is employed in some embodiments. In some embodiments, each user identity (across the customer 310, third-party vendor 330 and/or fourth-party vendor 340, for example,) has a public and private key pair, and the public key for a user is stored and publicly available from the public key server 450. Optionally, the functionality of the public key server 450 could be included as part of the third-party portal 200.

The client-side encryption functionality is optionally layered on top of the flows described above in conjunction with FIG. 3, allowing client-side encryption to be selectively enabled, as needed.

As shown in the example of FIG. 4, a submitter at the customer 310, such as customer ACME, submits a questionnaire to a person at third-party vendor 330, such as vendor FOO, and reviews responses. The recipient person at the third-party vendor 330 responds to the questionnaire and/or delegates the questionnaire to a fourth-party vendor 340 or fifth party (not shown), for example. The fourth-party vendor 340 can then respond to the delegated questionnaire and/or delegate the delegated questionnaire to a fifth party (not shown)

Figure 5:
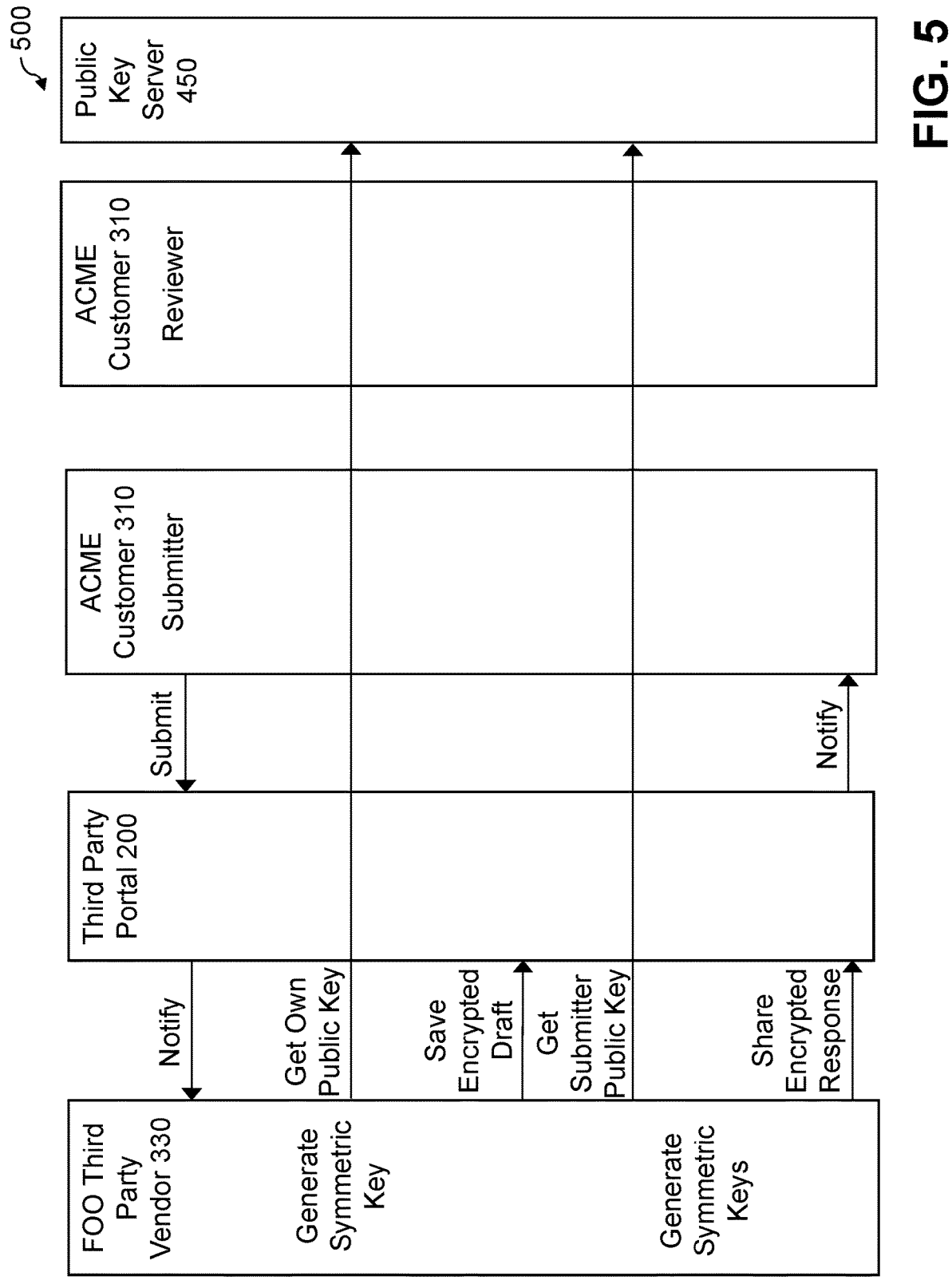
FIG. 5 is a communication diagram illustrating an exemplary implementation of a question delegation process according to some embodiments of the disclosure.

FIG. 5 is a communication diagram 500 illustrating an exemplary implementation of a question delegation process according to an embodiment of the disclosure, where customers 110 submit questionnaires directly to the third-party portal 200, without an intermediate portal 120. As shown in the example of FIG. 5, a submitter at the customer 310, such as customer ACME, submits a questionnaire to a person at third-party vendor 330, such as vendor FOO. The recipient person at the third-party vendor 330 is notified of the questionnaire and responds to the questionnaire. In the embodiment of FIG. 5, the third-party vendor 330 employs client-side encryption functionality.

The embodiment of FIG. 5 assumes that client-side encryption is implemented by, for example, a mobile device, web client, and/or browser plug-in and not done by the user, using keys obtained from the public key server 450. It is noted that whatever party 310, 330, 340 is sharing the data fully controls the generation of all the keys used to encrypt the data and the creation of encrypted data in the example of FIG. 5.

The third-party vendor 330 generates responses on the client side and identifies responses, R, that the third-party vendor 330 considers to be sensitive.

In some embodiments, the third-party vendor 330 generates a symmetric key $K_v$ and encrypts the sensitive responses, R, with $K_v$ to generate $E(K_v, R)$. The third party then encrypts the symmetric key $K_v$ with its own public key, $P_V$, obtained from the public key server 450 to generate $E(P_V, K_v)$. The third-party vendor 330 then saves an encrypted draft of the response in the third-party portal 200. This encrypted draft is represented, for example, as a CMS (Cryptographic Message Syntax) message with the following enveloped data:

i. encryptedContentInfo: $E(K_v, R)$ from step a (this is the encrypted payload)

ii. recipientInfo: $E(P_V, K_v)$ from step b (this is the encrypted key).

Optionally, a signed data section could also be added to the CMS message to provide guarantees about the integrity of the data.

Eventually, the third-party vendor 330 will be ready to share the response with the submitter at the customer 310. The third-party vendor 330 creates a new CMS message specifying the submitter as a recipient, specifying the public key, $P_S$, of the submitter obtained from the public key server 450 and using a new generated symmetric key, $K_S$. This follows the same process outlined above. The third-party vendor 330 then submits the encrypted message to the third-party portal 200. The third-party portal 200 stores the CMS message, and notifies the submitted at the customer 310. Note that the third-party portal 200 has no access to the underlying sensitive responses.

Figure 6:
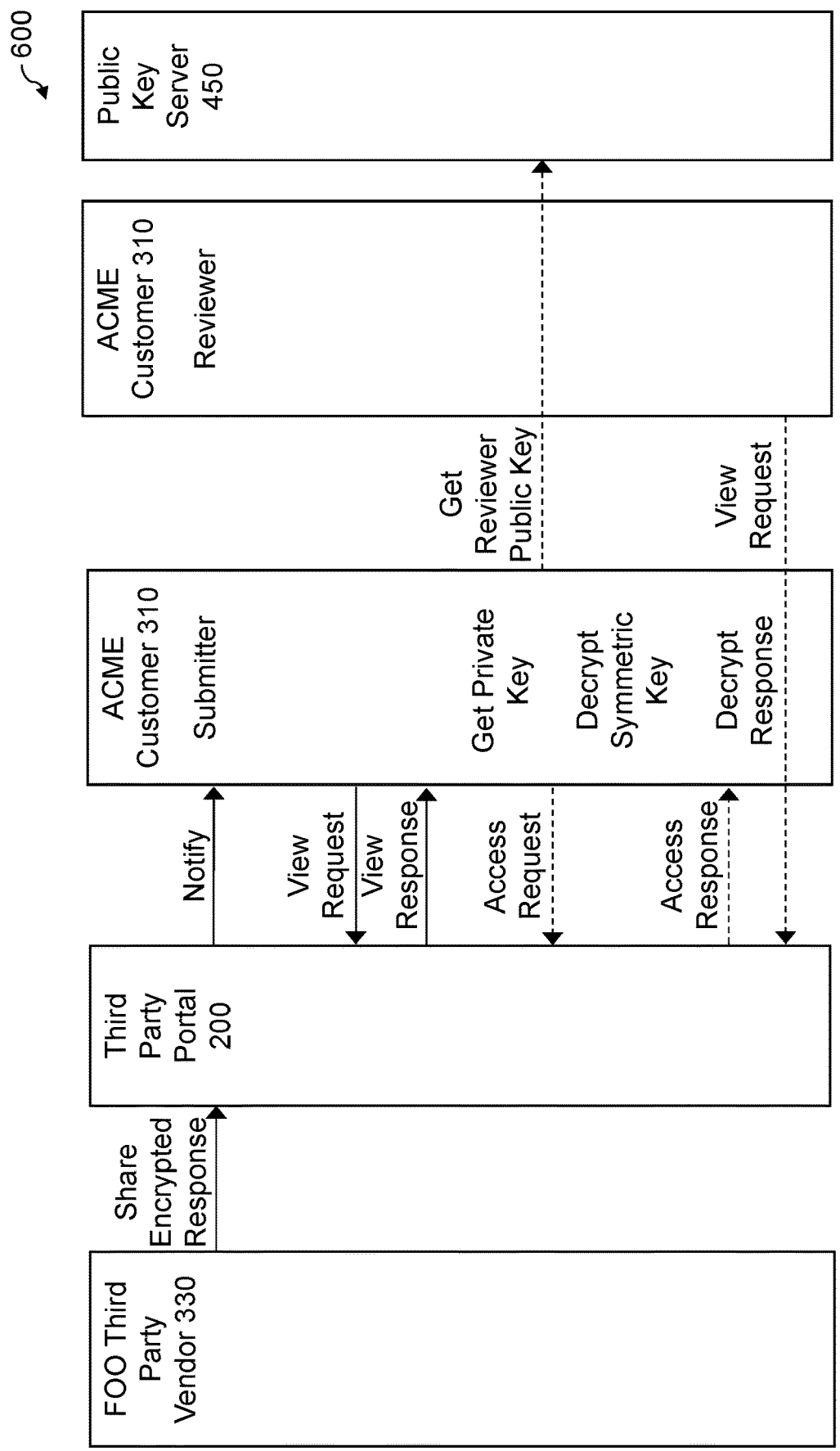
FIG. 6 is a communication diagram illustrating an exemplary implementation of a question delegation process according to an embodiment of the disclosure, where a submitter associated with the customer views the response to his or her questionnaire, and, optionally, provides access to a reviewer of the customer to view the sensitive answers to the questionnaire.

FIG. 6 is a communication diagram 600 illustrating an exemplary implementation of a question delegation process according to an embodiment of the disclosure, where a submitter associated with the customer 310 views the response to his or her questionnaire, and, optionally, provides access to a reviewer of the customer 310 to view the sensitive answers to the questionnaire. As shown in FIG. 6, the third-party vendor 330 initially shares the encrypted response (described above) with the third-party portal 200, and the third-party portal 200 notifies submitter of the customer 310 of the encrypted response.

To decrypt the encrypted answers, the submitter gets the private key $K_S$ for his or her own public key $P_S$ from the public key server 450. The submitter will then decrypt $E(P_S, K_S)$ using his or her private key to recover $K_S$ and decrypt the encrypted payload $E(K_S, R)$. It is noted that this functionality is performed client-side in the embodiment of FIG. 6. The third-party portal 200 provides the encrypted data to the submitter.

As noted above the, submitter can optionally send an access request to provide access to another person, a reviewer, from the customer 310 (e.g., a member of his or her team) to view the sensitive answers to the questionnaire. As shown in FIG. 6, the submitter gets the public key of the reviewer $P_R$, and encrypts $K_S$ with $P_R$ to produce $E(P_R, K_S)$. The submitter creates an access request on behalf of the reviewer. The access request contains $E(P_R, K_S)$.

If allowed, the third-party portal 200 adds the reviewer to the list of allowed viewers of the questionnaire and saves $E(P_R, K_S)$ with the rest of the questionnaire data by creating a new CMS message with the new recipient. Note that the existing encrypted questionnaire data is used as part of the new CMS message. When the reviewer retrieves the questionnaire with a view request, the third-party portal 200 returns the encrypted CMS message. It follows the same process as the submitter to then decrypt and view the sensitive responses in the questionnaire.

Client-Side Encryption: Revocation

There are two cases for revocation: 1) the third-party vendor 330 wants to remove access to the customer 310 entirely, including the submitter and all reviewers, and 2) the submitter wants to remove access for one or more reviewers.

Case 1) is accomplished in some embodiments by the third-party vendor 330 sending a revocation request to the third-party portal 200. The third-party portal 200 deletes all of the saved CMS messages and all access privileges for the customer in question.

Case 2) is accomplished, for example, by the submitter sending a revocation request to the third-party portal 200. The third-party portal 200 would then update its list of allowed viewers by removing the specified reviewer(s) and recreating a new CMS message for the remaining recipients. The underlying encrypted questionnaire data is reused as part of the new CMS message.

Client-Side Encryption: Key Rotation/Rekeying

In one or more embodiments, key rotation can be performed by the third-party vendor 330 on demand or based on a schedule. The third-party vendor 330 makes a request to the Portal to retrieve all CMS recipient information stored for itself or for customers. For each existing CMS message in the third-party portal 200, the third-party vendor 330 generates a new CMS message with the payload encrypted with a new symmetric key and the new symmetric key encrypted with the public keys of each recipient (submitter, reviewer, or itself). The third-party vendor 330 then sends the new CMS messages to the third-party portal 200 to save and replace the existing CMS messages. This whole process can be done transparently so that customers are not aware of the key rotation.

Client-Side Encryption: Delegation

Suppose that a third-party vendor 330 delegates the response to a set of questions to a fourth party, and the fourth party considers those responses to be sensitive. In this case, the fourth-party vendor 340 may not know ahead of time which customers the third-party vendor 330 will be sharing responses to, and it is possible that the third party may want to share responses with new customers down the road.

To address this situation, instead of sending a single CMS message addressed to the third-party vendor 330, the fourth-party vendor 340 sends c CMS messages addressed to the third party 330. c is a parameter that controls how many customers the third party 330 can share the data of the fourth-party vendor 340 with. Each of the c CMS messages has a payload encrypted with a different symmetric key. Each time a third party 330 shares data of a fourth-party vendor 340 with a customer 310, the third-party vendor 330 uses up one of the CMS messages. When the third party 330 runs out of shares, the third party 330 must go back to the fourth-party vendor 340 to get a new set of CMS messages.

This model allows the fourth-party vendor 340 to fully control encryption and key management for the data it controls.

Signatures can be added during delegation as well. A fourth-party vendor 340 can send a signed CMS message to a third-party vendor 330. The third-party vendor 330 can re-sign that message (including the signature of the fourth party) again with its own signing key.

The overall model can be extended to fifth, sixth parties, and so on, as would be apparent to a person of ordinary skill in the art based on the present disclosure.

Client-Side Encryption: Auditing

Any significant actions related to client-side encryption are audited by the third-party portal 200, including, for example: a submitter adding a reviewer, key rotation and revocation.

Client-Side Encryption: An Alternate Stronger Revocation Model

In the above scheme, when a submitter revokes access to a reviewer, the encrypted data remains encrypted with a symmetric key that was previously known to the reviewer. The third-party portal 200 still enforces access control to the encrypted data, but for stronger security it may be desirable to discard the existing encrypted data and encryption key entirely.

The above model can be adapted to support revocation with rekeying. When a third party 330 shares a questionnaire response to a customer, instead of sending one CMS message, the third-party vendor 330 sends r CMS messages. Each CMS message has its content encrypted with a different encryption key.

The third-party portal 200 keeps track of an index i that points to the current CMS message for the customer 310. When a submitter adds access to a reviewer, index i stays the same. When a submitter revokes access to a reviewer, the third-party portal 200 discards the CMS message at index i and increments index i by 1. It is as if the third party 330 has reshared the questionnaire response with the customer 310, except that the sharing has been done in advance by the third party 330.

When r is exceeded, the customer 310 needs to go back to the third party 330 through the third-party portal 200 to get a new set of CMS messages.

This alternate revocation model also works with delegation in the mix. When a fourth party 340 sends a response to a third party, instead of sending c CMS messages (as described above), the fourth party 340 sends c x r CMS messages. The fourth party 340 then passes on r copies to each customer 310 it is sharing fourth-party data with.

Separated Identities Model

In the "separated identities" model, an intermediate portal 120 (FIG. 1), such as RSA Archer, is used by the customer 310 (the submitter and reviewer personas) to submit assessments and receive questionnaire responses. The submitter and reviewer personas do not have accounts with the third-party portal 200. All communication between the intermediate portal 120 and the third-party portal 200 is mediated using an administrative service account provisioned to the customer 310 by the third-party portal 200.

Figure 7:
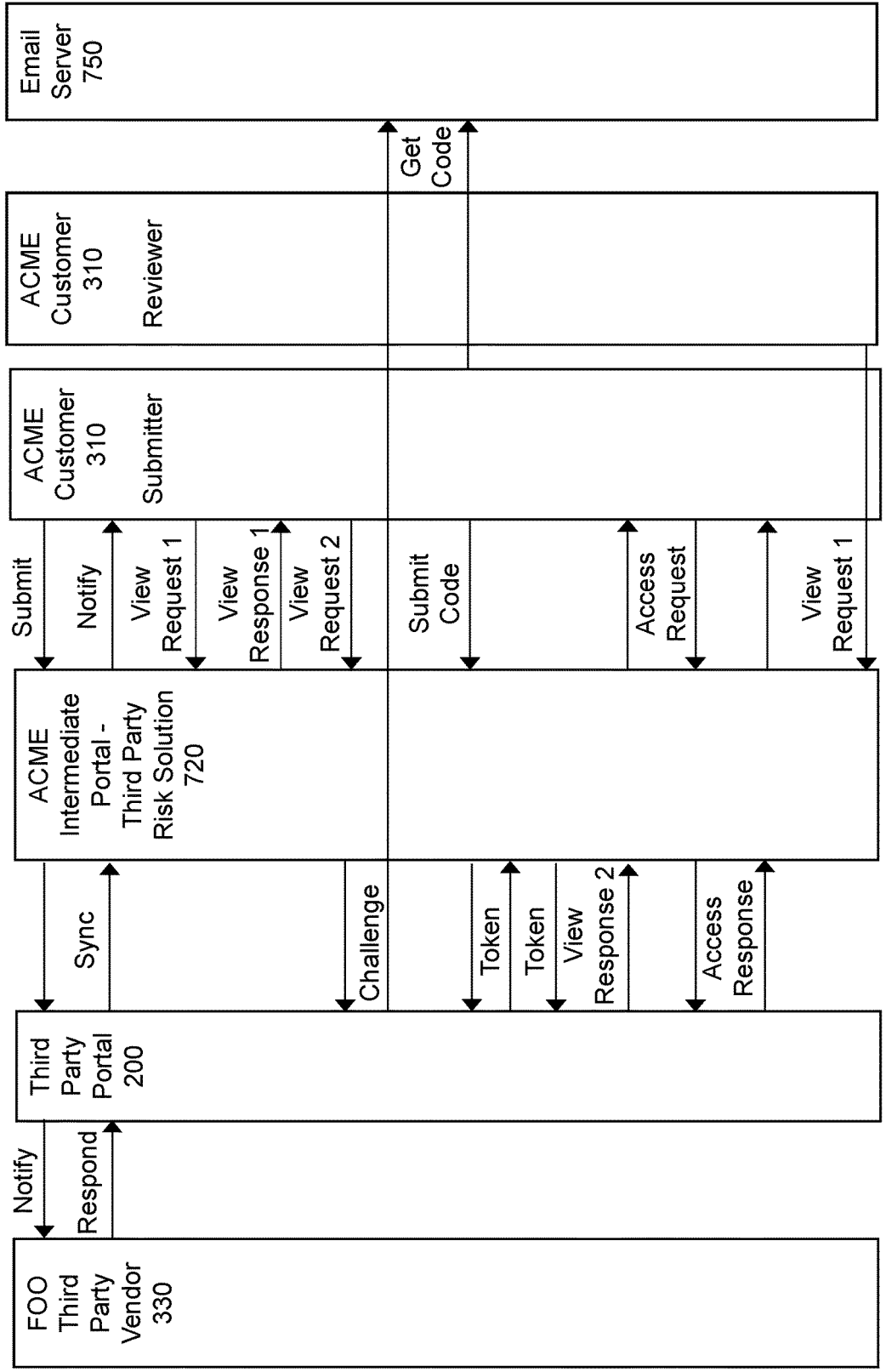
FIG. 7 is a communication diagram illustrating an exemplary implementation of a question delegation process according to one embodiment of the disclosure, where customers submit questionnaires to the third-party portal using the intermediate portal of FIG. 1 with email verification.

FIG. 7 is a communication diagram 700 illustrating an exemplary implementation of a question delegation process according to an embodiment of the disclosure, where customers 110 submit questionnaires to the third-party portal 200, using the intermediate portal 120 of FIG. 1 with email verification. As shown in the example of FIG. 7, a submitter at the customer 310, such as customer ACME, submits a questionnaire via an intermediate portal 720 of the customer 310 with a third-party risk solution, to the third-party portal 200. The third-party portal 200 notifies the third-party vendor 330, such as vendor FOO. The recipient person at the third-party vendor 330 is notified of the questionnaire and responds to the questionnaire. In the embodiment of FIG. 7, the third-party vendor 330 does not employ client-side encryption functionality.

Consider the requirements for time-limited access of sensitive data and limiting the number of unique people with access. Generally, when the intermediate portal 720 pulls down the questionnaire data from the third-party portal 200, the intermediate portal 720 only syncs non-sensitive responses, and sensitive responses remain stored in the storage of the third-party portal 200. Sensitive response data is replaced by a link in the intermediate portal 720. When a submitter or reviewer wants to a view the sensitive responses to the questionnaire, the intermediate portal 720 automatically follows the link on behalf of the user. The user must then verify his or her identity to access the sensitive data. This can be accomplished in two possible ways: email verification with an email server 750, shown in FIG. 7, or automatic verification, as discussed further below in conjunction with FIG. 8. These flows can be used together for extra identity assurance, as would be apparent to a person of ordinary skill in the art.

As in the "Federated Identities" models discussed above, where there is no intermediate portal 120, the third-party vendor 330 responds back to the questionnaire with an expiration and limit for the number of people allowed to access the sensitive data set as parameters. The submitter is notified. Only non-sensitive data is synchronized back to the intermediate portal 720. Sensitive data remains in the storage of the third-party portal 200. In lieu of getting the sensitive data, the intermediate portal 720 gets a link to the third-party portal 200 which serves as a pointer to the sensitive data.

The submitter chooses to view the questionnaire responses. All non-sensitive responses are viewable immediately from the intermediate portal 720. The intermediate portal 720 then prompts the submitter to view the sensitive responses. If the submitter wants to proceed, the intermediate portal 720 automatically follows the link to the third-party portal 200. (This can be implemented, for example, through Application Programming Interface (API) calls or by embedding a browser frame within the intermediate portal 720 itself.)

The third-party portal 200 sends a challenge code in an email to the email address of the submitter, which is assumed to be available from the original questionnaire submitted by the submitter. The submitter checks his or her email and enters the challenge code into the intermediate portal 720/third-party portal 200 interface.

The third-party portal 200 verifies the challenge code and checks that the expiration date on the sensitive data has not passed. If the expiration date on the sensitive data has not passed, the third-party portal 200 issues an access token back to the intermediate portal 720, which the intermediate portal 720 stores securely. The token is similar in intent to a JWT (JSON Web Token). The token is signed by the third-party portal 200, contains an access token expiration time (which should not be past the expiration set by the third party), and claims in the form of questionnaire responses that the submitter has access to.

The intermediate portal 720 resubmits this token back to the third-party portal 200 to retrieve the sensitive data and render it in the interface of the intermediate portal 720. It is important to note that the intermediate portal 720 should not persist this data. It should remain in memory on the side of the intermediate portal 720.

While the token is not expired, the submitter can continue to view the sensitive questionnaire response data without reverifying himself After the token has expired, the submitter needs to reverify himself Optionally, the third-party portal 200 can issue a refresh and access token together, and the intermediate portal 720 can automatically use the refresh token to retrieve a new access token without requiring the submitter to re-authenticate himself. The third-party portal 200 continues to check that the questionnaire expiration date has not passed with each access and refresh.

Suppose the submitter later wants to grant access to a reviewer to view the questionnaire. The submitter sends an access request to the third-party portal 200 through the intermediate portal 720 to grant access to a reviewer, with the email address of the reviewer included in the request.

The third-party portal 200 checks if the limit for the number of people allowed access is already met. If the limit has not been met, the third-party portal 200 adds the email of the reviewer to the list of people allowed access to the sensitive data.

When the reviewer later seeks to access sensitive data in the questionnaire, he or she follows the same flow as the submitter (as described above).

Figure 8:
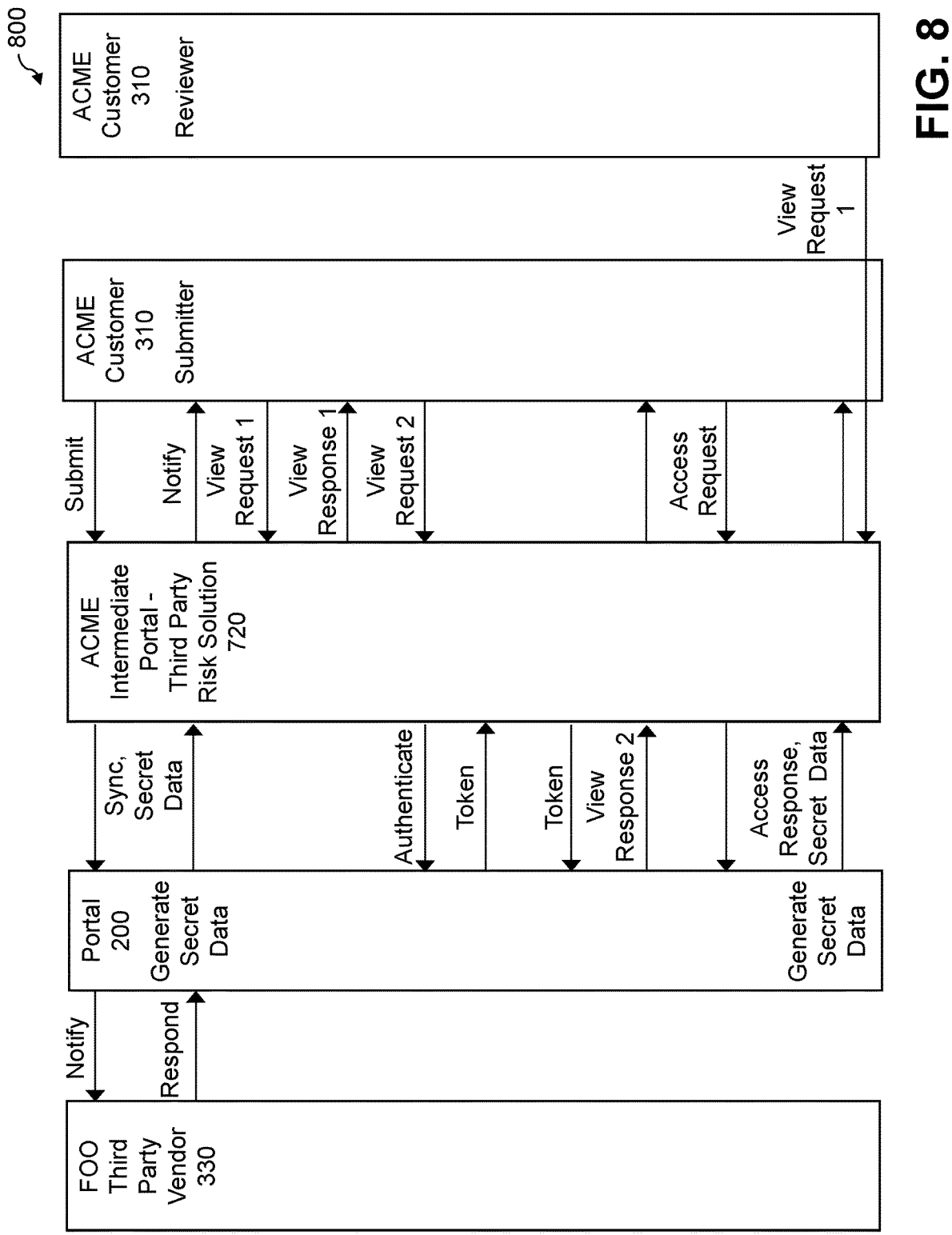
FIG. 8 is a communication diagram illustrating an exemplary implementation of a question delegation process according to one embodiment of the disclosure, where customers submit questionnaires to the third-party portal using the intermediate portal of FIG. 1 with automated verification.

FIG. 8 is a communication diagram 800 illustrating an exemplary implementation of a question delegation process according to an embodiment of the disclosure, where customers 110 submit questionnaires to the third-party portal 200, using the intermediate portal 120 of FIG. 1 with automated verification. As noted above, the automated verification flow of FIG. 8 is an alternative way to verify the identity of the submitter or reviewer. Compared to the email verification flow, the automated verification provides a better user experience, as the user does not need to check his email and enter a challenge code. However, automated verification places a greater burden on the secondary system (intermediate portal 720) to securely maintain secrets.

As in the email verification flow of FIG. 7, after a third party responds to a questionnaire, only non-sensitive data is synchronized back to the intermediate portal 720. Sensitive data remains stored in the third-party portal 200, and a pointer to the sensitive data in the form of a link is synchronized back to the intermediate portal 720. In contrast to the email verification flow of FIG. 7, in addition to the link, secret data tied to the submitter identity, in the form of an email address, is generated by the third-party portal 200 and sent back to the intermediate portal 720. The third-party portal 200 also keeps this secret data. The nature of the secret data depends on the method of authentication to be used when the submitter views the sensitive data in the questionnaire (to be described below).

The submitter chooses to view the questionnaire responses. All non-sensitive responses are viewable immediately from the intermediate portal 720. The intermediate portal 720 then prompts the submitter to view the sensitive responses. If the submitter wants to proceed, the intermediate portal 720 automatically follows the link to the third-party portal 200. (This can be implemented through API calls or by embedding a browser frame within the intermediate portal 720 itself.)

The intermediate portal 720 automatically uses the secret data stored locally to authenticate to the third-party portal 200 using the email address of the submitter as his identity. Authentication can be accomplished in any number of ways. For instance, the secret data can be interpreted as a password, and the third-party portal 200 can simply verify the password against a salted hash kept at the third-party portal 200. Alternatively, the SRP (Secure Remote Password) protocol can be used to verify the password. Alternatively, the secret data can be a certificate private/public key pair, and the intermediate portal 720 can authenticate on behalf of the submitter using client-side certificate authentication.

Similar to the email verification flow, a JWT-like access token is returned back to the intermediate portal 720, and this can be resubmitted by the intermediate portal 720 to gain access to the sensitive data.

If a submitter later wants to grant access to the questionnaire to a reviewer on his team, for example, he or she sends an access request through the intermediate portal 720. Similar to the email verification flow of FIG. 7, the third-party portal 200 checks the limit for maximum people allowed access and returns an access response accordingly. In contrast to the email verification flow of FIG. 7, this access response also includes secret data that the reviewer can use to authenticate to the third-party portal 200 later on. This secret data is stored securely in the intermediate portal 720 and associated with the reviewer. The third-party portal 200 also keeps this secret data and associates it with the email address of the reviewer.

When the reviewer later seeks to access sensitive data in the questionnaire, he or she follows the same flow as the submitter (described above).

In various embodiments, all authentications to the third-party portal 200 and all accesses to sensitive data in the third-party portal 200 are audited, as well as requests by submitters to grant or revoke rights to reviewers.

Delegation, revocation, and client-side encryption all follow the same logic as described above for the "federated identities" model, where there is no intermediate portal 720, with the exception that the intermediate portal 720 simply acts as an intermediary to communicate between the submitter and reviewer of the customer 310 and the third-party portal 200.

Figure 9:
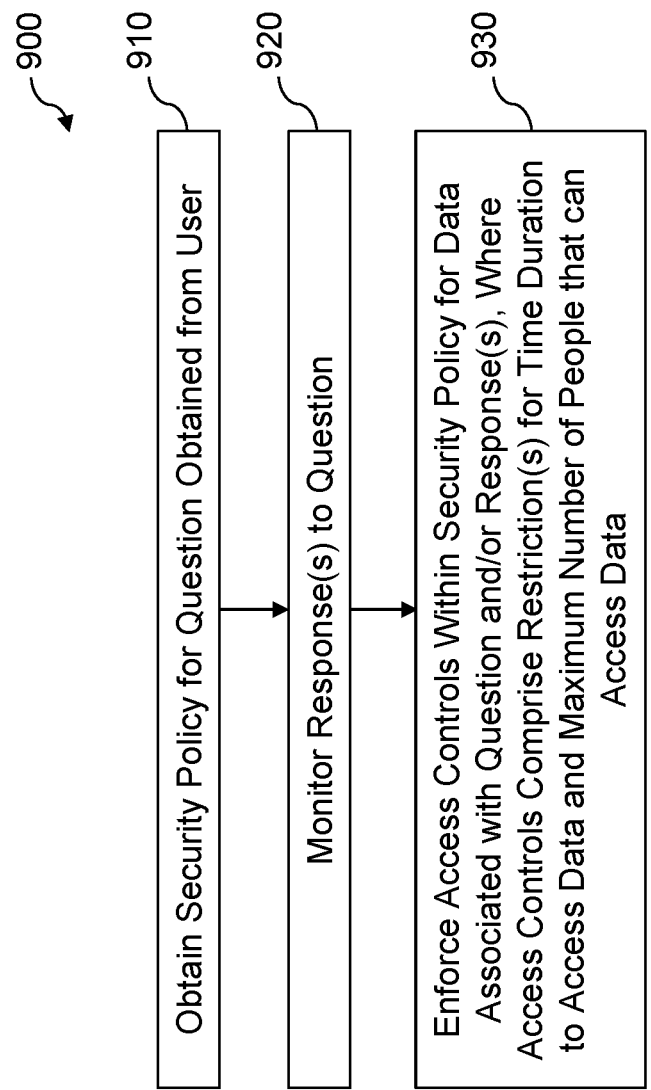
FIG. 9 is a flow chart illustrating an exemplary implementation of a question delegation access control enforcement process, according to one embodiment of the disclosure.

FIG. 9 is a flow chart illustrating an exemplary implementation of a question delegation access control enforcement process 900, according to one embodiment of the disclosure. As shown in FIG. 9, the question delegation access control enforcement process 900 obtains a security policy for at least one question obtained from a user during step 910. Thereafter, the question delegation access control enforcement process 900 monitors one or more responses to the at least one question during step 920.

The third-party portal 200, for example, enforces one or more access controls within the security policy for data associated with the at least one question and/or the one or more responses to the at least one question during step 930. The one or more access controls comprise, for example, restrictions with respect to one or more of a time duration to access the data and a maximum number of people that may access the data, as described herein.

One or more embodiments of the disclosure provide a third-party portal 200 for access control enforcement for question delegation systems. In some embodiments, an access control framework and workflow are provided as part of the third-party portal 200 for companies and third parties to describe their access control requirements for questionnaires and/or related responses in such a way that an intermediate platform shared by the companies and third parties can interpret and enforce those access control requirements. The disclosed intermediate platform allows companies to publish questionnaires to be processed by the third parties and allows third parties to answer questionnaires and submit responses back to companies. Among other benefits, the disclosed access control framework makes access control requirements between companies and third parties explicit, and these access control requirements can be technically enforced, simultaneously protecting third parties and companies from the mishandling of third-party data.

In some embodiments, the disclosed techniques for access control enforcement for question delegation provide a systematic way for delegating questions to third parties, and for ensuring the enforcement of access controls associated with the delegated questions and/or related responses.

One or more embodiments of the disclosure provide improved methods, apparatus and computer program products for access controls for question delegation environments. The foregoing applications and associated embodiments should be considered as illustrative only, and numerous other embodiments can be configured using the techniques disclosed herein, in a wide variety of different applications.

It should also be understood that the disclosed question delegation and access control enforcement techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for access control enforcement for question delegation may be implemented using one or more processing platforms. One or more of the processing modules or other components may therefore each run on a computer, storage device or other processing platform elements. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based third-party portal 200, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based third-party portal platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. These platforms may also be used to implement at least portions of other information processing systems in other embodiments.

Figure 10:
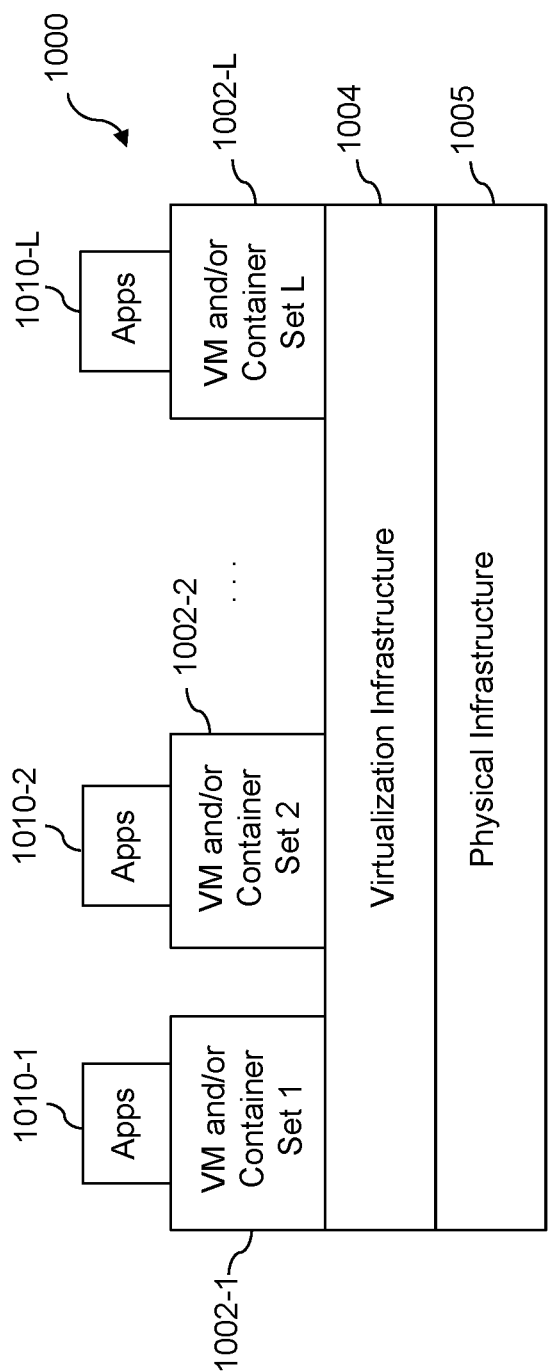
FIG. 10 illustrates an exemplary processing platform that may be used to implement at least a portion of one or more embodiments of the disclosure comprising a cloud infrastructure.

FIG. 10 shows an example processing platform comprising cloud infrastructure 1000. The cloud infrastructure 1000 comprises a combination of physical and virtual processing resources that may be utilized to implement at least a portion of the third-party portal 200. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, ... 1010-L running on respective ones of the VMs/container sets 1002-1, 1002-2, ... 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. Such implementations can provide question delegation and access control enforcement functionality of the type described above for one or more processes running on a given one of the VMs. For example, each of the VMs can implement question delegation and access control enforcement control logic and associated agreements for providing question delegation and access control enforcement functionality for one or more processes running on that particular VM.

An example of a hypervisor platform that may be used to implement a hypervisor within the virtualization infrastructure 1004 is the VMware® vSphere® which may have an associated virtual infrastructure management system such as the VMware® vCenter™. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system. Such implementations can provide question delegation and access control enforcement functionality of the type described above for one or more processes running on different ones of the containers. For example, a container host device supporting multiple containers of one or more container sets can implement one or more instances of question delegation and access control enforcement control logic and associated agreements for use in question delegation.

As is apparent from the above, one or more of the processing modules or other components of the third-party portal 200 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises at least a portion of the given system and includes a plurality of processing devices, denoted 1102-1, 1102-2, 1102-3, ... 1102-K, which communicate with one another over a network 1104. The network 1104 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1102-1 in the processing platform 1100 comprises a processor 1110 coupled to a memory 1112. The processor 1110 may comprise a microprocessor, a microcontroller, an application specific integrated circuit (ASIC), a field programmable gate array (FPGA) or other type of processing circuitry, as well as portions or combinations of such circuitry elements, and the memory 1112, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and the given system may include additional or alternative processing platforms, as well as numerous distinct processing platforms in any combination, with each such platform comprising one or more computers, storage devices or other processing devices.

Figure 11:
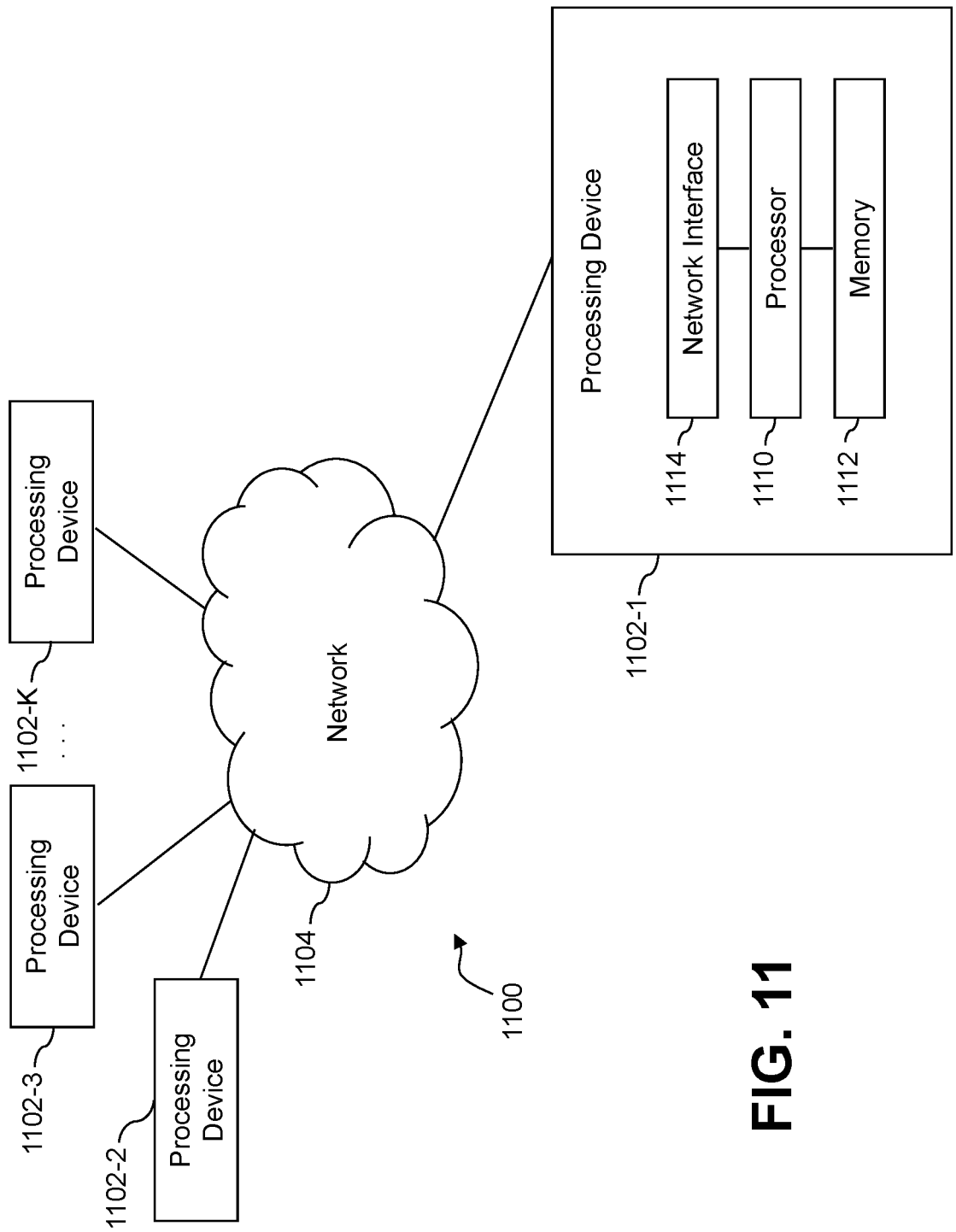
FIG. 11 illustrates another exemplary processing platform that may be used to implement at least a portion of one or more embodiments of the disclosure.

Multiple elements of an information processing system may be collectively implemented on a common processing platform of the type shown in FIG. 10 or 11, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining a security policy specified by a first user for at least one question in a questionnaire provided by the first user, wherein at least one designated second user, distinct from the first user, composes one or more responses to the at least one question, wherein the at least one question comprises an interrogative expression to obtain information from the at least one designated second user, and wherein the security policy comprises one or more access controls for data associated with one or more of the at least one question and the one or more responses to the at least one question from the at least one designated second user, wherein the one or more access controls specified by the first user comprise at least one access control with respect to the data associated with at least one response to the at least one question from the at least one designated second user;
monitoring one or more responses from the at least one designated second user to the at least one question; and
enforcing, by a third-party portal processing system, the one or more access controls specified by the first user within the security policy, wherein the one or more access controls, specified by the first user and enforced by the third-party portal processing system, comprise one or more restrictions with respect to one or more of a time duration to access the data associated with at least one response of the one or more responses to the at least one question from the at least one designated second user and a number of people that may access the data associated with at least one response of the one or more responses to the at least one question from the at least one designated second user;
wherein the third-party portal processing system comprises at least one processing device comprising a processor coupled to a memory.

2. The method of claim 1, further comprising evaluating whether the time duration to access the data has expired before providing access to the data.

3. The method of claim 1, further comprising evaluating whether the number of people that may access the data has been exceeded before providing access to the data.

4. The method of claim 1, further comprising revoking access to one or more persons authorized to access the data by revoking a key used to encrypt the data.

5. The method of claim 1, further comprising a client-side encryption of the data by a provider of the data using a symmetric key pair to generate an encrypted version of the data.

6. The method of claim 5, wherein the third-party portal processing system stores the encrypted version of the data comprising an encrypted payload and an encrypted symmetric key.

7. The method of claim 5, further comprising signing the encrypted version of the data.

8. The method of claim 5, further comprising replacing the encrypted version of the data following a key rotation.

9. The method of claim 5, wherein the third-party portal processing system provides an encrypted version of the data with a corresponding public key to a recipient of the data.

10. The method of claim 5, wherein the third-party portal processing system stores an encrypted version of the data for each recipient that may access the encrypted data.

11. The method of claim 1, further comprising verifying an identity of a recipient before providing access to the data.

12. The method of claim 11, wherein the verifying the identity of the recipient employs one or more of an email verification of the recipient and a verification based on secret data of the recipient stored locally to a validator using a network address of the recipient as an identity.

13. The method of claim 1, wherein the obtaining further comprises:
providing, by the third-party portal processing system, at least one third party with the at least one question obtained from the user and a corresponding user security policy, wherein the at least one question is to be processed by the at least one third party in accordance with the corresponding user security policy; and
providing a security policy response from the at least one third party to the user indicating one or more of an acceptance of the corresponding user security policy and one or more proposed modifications to the corresponding user security policy for the at least one question.

14. The method of claim 1, further comprising generating an audit of one or more accesses of the data for the at least one question.

15. The method of claim 1, further comprising revoking access to one or more persons authorized to access the data.

16. The method of claim 1, wherein said one or more access controls for data associated with the one or more of the at least one question and the one or more responses to the at least one question are specified as part of a delegation by the at least one designated second user of a preparation of one or more responses to another party, distinct from the first user and the at least one designated second user, for generating one or more of the responses.

17. The method of claim 1, wherein said one or more access controls for data associated with the one or more of the at least one question and the one or more responses to the at least one question can be shared as part of a delegation by the at least one designated second user of a preparation of one or more responses to another party, distinct from the first user and the at least one designated second user, by sending a number of messages comprising the data corresponding to a number of permitted recipients of the data.

18. A system, comprising:
a memory; and
at least one processing device, coupled to the memory, operative to implement the following steps:
obtaining a security policy specified by a first user for at least one question in a questionnaire provided by the first user, wherein at least one designated second user, distinct from the first user, composes one or more responses to the at least one question, wherein the at least one question comprises an interrogative expression to obtain information from the at least one designated second user, and wherein the security policy comprises one or more access controls for data associated with one or more of the at least one question and the one or more responses to the at least one question from the at least one designated second user, wherein the one or more access controls specified by the first user comprise at least one access control with respect to the data associated with at least one response to the at least one question from the at least one designated second user;

monitoring one or more responses from the at least one designated second user to the at least one question; and enforcing, by a third-party portal processing system, the one or more access controls specified by the first user within the security policy, wherein the one or more access controls, specified by the first user and enforced by the third-party portal processing system, comprise one or more restrictions with respect to one or more of a time duration to access the data associated with at least one response of the one or more responses to the at least one question from the at least one designated second user and a number of people that may access the data associated with at least one response of the one or more responses to the at least one question from the at least one designated second user.

19. The system of claim 18, further comprising a client-side encryption of the data by a provider of the data using a symmetric key pair to generate an encrypted version of the data.

20. A computer program product, comprising a tangible machine-readable storage medium having encoded therein executable code of one or more software programs, wherein the one or more software programs when executed by at least one processing device perform the following steps:

obtaining a security policy specified by a first user for at least one question in a questionnaire provided by the first user, wherein at least one designated second user, distinct from the first user, composes one or more responses to the at least one question, wherein the at least one question comprises an interrogative expression to obtain information from the at least one designated second user, and wherein the security policy comprises one or more access controls for data associated with one or more of the at least one question and the one or more responses to the at least one question from the at least one designated second user, wherein the one or more access controls specified by the first user comprise at least one access control with respect to the data associated with at least one response to the at least one question from the at least one designated second user;

monitoring one or more responses from the at least one designated second user to the at least one question; and enforcing, by a third-party portal processing system, the one or more access controls specified by the first user within the security policy, wherein the one or more access controls, specified by the first user and enforced by the third-party portal processing system, comprise one or more restrictions with respect to one or more of a time duration to access the data associated with at least one response of the one or more responses to the at least one question from the at least one designated second user and a number of people that may access the data associated with at least one response of the one or more responses to the at least one question from the at least one designated second user.

\* \* \* \* \*